(12) United States Patent
Nakayama (10) Patent No.: US 10,862,094 B2
(45) Date of Patent: Dec. 8, 2020

(54) METHOD FOR PRODUCING BATTERY PACK, AND BATTERY PACK

(71) Applicant: TOYOTA JIDOSHA KABUSHIKI KAISHA, Toyota (JP)

(72) Inventor: Hiroyuki Nakayama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 16/180,163

(22) Filed: Nov. 5, 2018

(65) Prior Publication Data

US 2019/0140246 A1 May 9, 2019

(30) Foreign Application Priority Data

Nov. 8, 2017 (JP) ................. 2017-215565

(51) Int. Cl.
| | |
|---|---|
| *H01M 2/20* | (2006.01) |
| *H01M 10/0525* | (2010.01) |
| *H01M 2/30* | (2006.01) |
| *H01M 2/06* | (2006.01) |
| *H01M 2/26* | (2006.01) |
| *H01M 2/10* | (2006.01) |
| *H01R 11/28* | (2006.01) |
| *H01M 2/32* | (2006.01) |
| *H01M 10/052* | (2010.01) |

(52) U.S. Cl.
CPC ............ *H01M 2/202* (2013.01); *H01M 2/06* (2013.01); *H01M 2/1016* (2013.01); *H01M 2/204* (2013.01); *H01M 2/206* (2013.01); *H01M 2/26* (2013.01); *H01M 2/30* (2013.01); *H01M 2/32* (2013.01); *H01M 10/0525* (2013.01); *H01R 11/288* (2013.01); *H01M 10/052* (2013.01); *H01M 2220/20* (2013.01)

(58) Field of Classification Search
CPC ...... H01M 2/202; H01M 2/204; H01M 2/206; H01M 2/32
USPC .......................................... 429/179
See application file for complete search history.

(56) References Cited

U.S. PATENT DOCUMENTS

| | | | |
|---|---|---|---|
| 2014/0030933 A1 | 1/2014 | Wiegmann et al. | |
| 2014/0295251 A1* | 10/2014 | Horikoshi | H01M 2/206 |
| | | | 429/158 |

(Continued)

FOREIGN PATENT DOCUMENTS

| | | |
|---|---|---|
| JP | 2014-006977 A | 1/2014 |
| JP | 2015-065105 A | 4/2015 |
| KR | 10-2015-0069733 A | 6/2015 |

*Primary Examiner* — James M Erwin
(74) *Attorney, Agent, or Firm* — Sughrue Mion, PLLC (57) ABSTRACT

Provided is a battery pack in which multiple battery cells are electrically connected by using bus bars, with little resistance variability and without plating of electrode external terminals. A method for producing a battery pack disclosed herein includes: a step of stacking a plurality of battery cells each having a battery case and electrode external terminals provided outside the battery case; and a step of electrically connecting the electrode external terminals of the plurality of battery cells by using metal-made bus bars. The electrode external terminals are not plated. The method for producing a battery pack further includes forming a fresh surface of terminal material at each surface of the electrode external terminals; and bringing the fresh surface and each metal-made bus bar into contact with each other.

1 Claim, 7 Drawing Sheets

(56) References Cited

U.S. PATENT DOCUMENTS

2015/0171404 A1   6/2015   Kwon
2015/0180004 A1   6/2015   Harayama
2015/0188244 A1*  7/2015   Yoshioka ................ H01M 2/20
                                                      439/442

* cited by examiner

METHOD FOR PRODUCING BATTERY PACK, AND BATTERY PACK

BACKGROUND OF THE INVENTION

1. Field of the Invention

The present teaching relates to a method for producing a battery pack. The present teaching relates also to a battery pack. The present application claims priority to Japanese Patent Application No. 2017-215565 filed on Nov. 8, 2017 and the entire contents thereof are incorporated herein by reference.

2. Description of the Related Art

Secondary batteries such as lithium ion secondary batteries and nickel-hydride batteries that are used as power sources mounted in vehicles are ordinarily utilized in the form of battery backs resulting from connection of a plurality of battery cells in series, in order to increase output.

Battery backs have a configuration wherein electrode external terminals provided outside the case of battery cells are electrically connected using bus bars, for instance as disclosed in Japanese Patent Application Publication No. 2014-006977. Metallic materials such as aluminum, aluminum alloys, copper and copper alloys are used in the electrode external terminals. Such metallic materials oxidize readily, and an oxide film is often formed on the surface of the electrode external terminals. Although electrical conduction remains even when an oxide film is formed on the surface of the electrode external terminals, that oxide film constitutes a resistive element, the degree of resistance of which depends on the thickness of the oxide film. As a result, a problem of resistance variability occurs in that the resistance of the oxide film varies with each battery cell, in the battery pack. The surface of the electrode external terminals is therefore plated with nickel, gold, silver or the like, in order to prevent formation of the oxide film.

SUMMARY OF THE INVENTION

However, plating of the electrode external terminals translates into higher costs of the battery pack. Accordingly, a demand exists for the development of battery backs in which multiple battery cells are electrically connected using bus bars, with little resistance variability, and without plating of electrode external terminals.

It is therefore an object of the present teaching to provide a battery pack in which multiple battery cells are electrically connected using bus bars, with little resistance variability, and without plating of electrode external terminals.

The method for producing a battery pack disclosed herein includes: a step of stacking a plurality of battery cells each having a battery case and electrode external terminals provided outside the battery case; and a step of electrically connecting the electrode external terminals of the plurality of battery cells by using metal-made bus bars. The electrode external terminals are not plated. The method for producing a battery pack further includes forming a fresh surface of terminal material at each surface of the electrode external terminals; and bringing the fresh surface and each metal-made bus bar into contact with each other.

In such a configuration, the metal-made bus bar and the fresh surface of terminal material are in contact with each other, and accordingly it becomes possible to provide a battery pack in which multiple battery cells are electrically connected using bus bars, with little resistance variability, and without plating of electrode external terminals.

In a desired aspect of the method for producing a battery pack disclosed herein, the metal-made bus bar is harder than the electrode external terminal surface. A surface of contact of the metal-made bus bar with the electrode external terminal is a roughened surface having a predetermined surface roughness. In the electrical connection step, the electrode external terminal and the metal-made bus bar are fastened together, a fresh surface of terminal material is formed at the surface of the electrode external terminal by roughening the surface of the metal-made bus bar, due to stress at the time of fastening, and the fresh surface and the metal-made bus bar are brought into contact with each other.

In such a configuration, a fresh surface of a terminal material can be formed at the surface the electrode external terminal, by the roughened surface of the metal-made bus bar, and the fresh surface and the metal-made bus bar can be brought into contact with each other. The above effect can be brought out effectively as a result. This is also advantageous in that except for the use of bus bars having a predetermined surface roughness, processes of conventional methods for producing a battery pack can be employed to without modification.

In a desired aspect of the method for producing a battery pack disclosed herein, in the electrical connection step, the metal-made bus bar is brought into contact with the electrode external terminal, and next the metal-made bus bar is caused to slide, to thereby form a fresh surface of terminal material at the surface of the electrode external terminal and bring the fresh surface and the metal-made bus bar into contact with each other.

In such a configuration, a fresh surface of terminal material can be formed at the surface of the electrode external terminal, and the fresh surface and the metal-made bus bar can be brought into contact with each other, as a result of a sliding operation. The above effect can be brought out effectively as a result.

In a desired aspect of the method for producing a battery pack disclosed herein, a fresh surface of terminal material is formed at the surface of the electrode external terminal using a physical method or a chemical method, prior to the electrical connection step; and the fresh surface and the metal-made bus bar are brought into contact with each other in the electrical connection step.

In such a configuration, a fresh surface of terminal material can be formed at the surface the electrode external terminals by a physical method or a chemical method, and the fresh surface and the metal-made bus bar can be brought into contact with each other. The above effect can be brought out effectively as a result.

A battery pack disclosed herein has a plurality of battery cells each having a battery case and electrode external terminals provided outside the battery case. The battery cells are stacked on each other. The electrode external terminals of the plurality of battery cells are electrically connected by a metal-made bus bar. The metal-made bus bar is harder than the electrode external terminal surface. A surface of contact of the metal-made bus bar with the electrode external terminal has protrusions and recesses. In an approximation of the protrusions as triangles, $$\{2[h^2+(w/2)^2]^{1/2}-w\}/w \geq \varepsilon \text{ is satisfied,}$$

where w denotes the base of the protrusion, h denotes the height of the protrusion, and $\varepsilon$ denotes the fracture strain of oxide film of terminal material of the electrode external terminals.

In such a configuration, the metal-made bus bar and the fresh surface of terminal material are in contact with each other, and accordingly it becomes possible to provide a battery pack in which multiple battery cells are electrically connected using bus bars, with little resistance variability, and without plating of electrode external terminals.

DESCRIPTION OF THE PREFERRED EMBODIMENTS

Embodiments of the present teaching will be explained below with reference to accompanying drawings. Any features other than the matter specifically set forth in the present specification and that may be necessary for carrying out the present teaching (for instance ordinary configurations and production processes of battery backs and not being characterizing features of the teaching) can be regarded as instances of design matter for a person skilled in the art based on known techniques in the technical field in question. The teaching can be realized on the basis of the disclosure of the present specification and common technical knowledge in the relevant technical field. In the drawings below, members and portions that elicit identical effects are denoted with identical reference symbols. The dimensional relationships (length, width, thickness and so forth) in the drawings do not reflect actual dimensional relationships.

Figure 1:
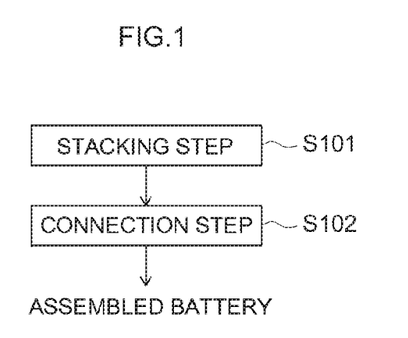
FIG. 1 is a flowchart illustrating schematically a method for producing a battery pack according to the present embodiment.

FIG. 1 illustrates schematically a method for producing a battery pack according to the present embodiment. The method for producing a battery pack according to the present embodiment includes a step (stacking step) S101 of stacking a plurality of battery cells each provided with a battery case having a rectangular parallelepiped shape and with electrode external terminals that are provided outside the battery case, such that side faces of large surface area of the cases overlap each other; and a step (connection step) S102 of electrically connecting the electrode external terminals of the plurality of battery cells using a metal-made bus bar. The electrode external terminals are not plated. The method for producing a battery pack according to the present embodiment further includes forming a fresh surface of terminal material at the electrode external terminals, and bringing the fresh surface and the metal-made bus bar into contact with each other.

The method for producing a battery pack according to the present embodiment will be explained in detail below while illustrated in the form of concrete embodiments.

First Embodiment

Figure 2:
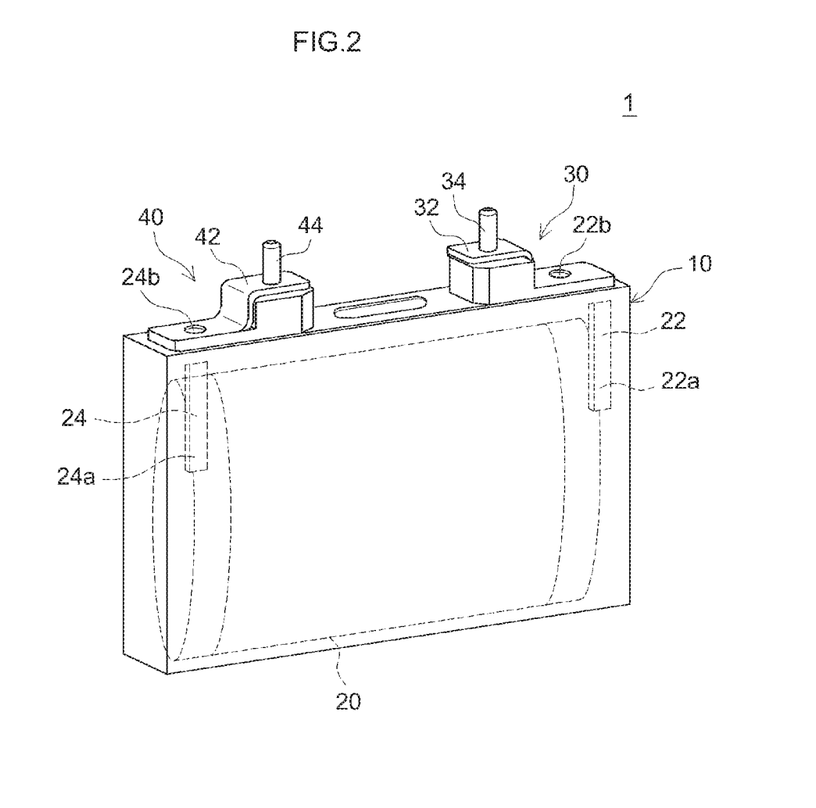
FIG. 2 is a perspective-view diagram illustrating an example of a battery cell used in a method for producing a battery pack according to the present embodiment.
Figure 3:
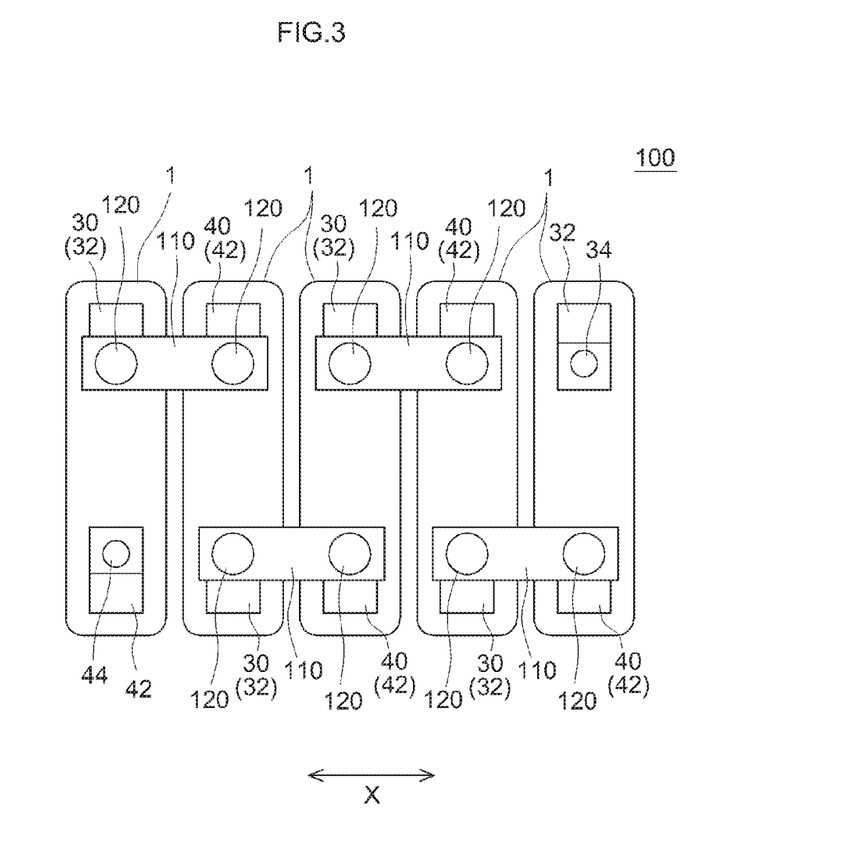
FIG. 3 is a top-view diagram illustrating an example of a battery pack obtained in accordance with the method for producing a battery pack of the present embodiment.

FIG. 2 illustrates a perspective-view diagram of an example of a battery cell used in the present embodiment. FIG. 3 illustrates a top-view diagram of an example of a battery pack obtained in accordance with the method for producing a battery pack of the present embodiment.

The stacking step S101 in the first embodiment can be carried out in accordance with a known method.

Specifically, a plurality of battery cells 1 is prepared first. Examples of the battery cells 1 include for instance lithium, ion secondary batteries, nickel-hydride batteries, nickel cadmium batteries, electrical double layer capacitors and the like. The battery cells 1 illustrated in the figures are lithium ion secondary batteries.

The battery cells 1 are each provided with a battery case 10 of rectangular parallelepiped shape and with an electrode body 20 accommodated inside the battery case 10. Each battery cell 1 is provided with a positive electrode terminal 30 and a negative electrode terminal 40 outside the battery case 10.

The positive electrode terminal 30 is provided with a Z-shaped plate-like positive electrode external terminal 32 and with a positive electrode-side bolt 34. The positive electrode terminal 30 is electrically connected to an electrode body 20 via a positive electrode-side internal collector terminal 22. The internal collector terminal 22 is provided with a collector plate 22a and a rivet 22b. The shape and configuration of the positive electrode external terminal 32 are not limited those illustrated in the figures.

The negative electrode terminal 40 is provided with a Z-shaped plate-like negative electrode external terminal 42 and with a negative electrode-side bolt 44. The negative electrode terminal 40 is electrically connected to an electrode body 20 via a negative electrode-side internal collector terminal 24. The internal collector terminal 24 is provided with a collector plate 24a and a rivet 24b. The shape and configuration of the negative electrode external terminal 42 are not limited those illustrated in the figures.

The positive electrode terminal 30 is for instance made of aluminum or an aluminum alloy. The positive electrode external terminal 32 is not plated. The negative electrode terminal 40 is for instance made of copper or of a copper alloy. The negative electrode external terminal 42 is not plated. These metallic materials are readily oxidized, and often an oxide film is formed on the surface of the positive electrode external terminal 32 and of the negative electrode external terminal 42.

A plurality of battery cells 1 is stacked next.

Specifically, a plurality of battery cells 1 is arrayed in a stacking direction X, as illustrated in FIG. 3. Herein, one of two adjacent batteries is disposed to be inverted relative to the other, such that the positive electrode terminal 30 and the negative electrode terminal 40 are lined up alternately along the stacking direction X. FIG. 3 illustrates schematically a battery pack 100, but the number of battery cells 1 is not limited those illustrated in the figures. The number of battery cells 1 is two or more, and is typically three to 35, (in particular 10 to 25).

A spacer (not shown) may be disposed between the battery cells 1. The spacer may be for instance a plate-like member functioning as a heat dissipation plate for efficiently dissipating heat generated inside the battery cells 1, for instance due to charge and discharge.

The connection step S102 will be explained next. In the connection step S102, the positive electrode external terminals 32 and the negative electrode external terminals 42 of the battery cells 1 are electrically connected by way of metal-made bus bars 110.

Specifically, the metal-made bus bars 110 are prepared first.

The bus bars 110 each have two through-holes into which the positive electrode-side bolt 34 and the negative electrode-side bolt 44 can be inserted.

A material harder than the surfaces of the positive electrode external terminal 32 and of the negative electrode external terminal 42 is used in the bus bars 110. Examples of the material of the bus bars 110 include for instance tin and nickel, desirably tin, in a case where the positive electrode external terminal 32 is made of aluminum or of an aluminum alloy, and the negative electrode external terminal 42 is made of copper or of a copper alloy.

The surfaces of contact (hereafter also referred to as "terminal contact surface") of the bus bars 110 with the positive electrode external terminal 32 of the positive electrode terminal 30 and the negative electrode external terminal 42 of the negative electrode terminal 40 are roughened surfaces having a predetermined surface roughness. The predetermined surface roughness of the roughened surfaces denotes roughness such that a fresh surface is generated through breakage of an oxide film at the surface of the positive electrode external terminal 32 and at the surface of the negative electrode external terminal 42, due to stress arising from a fastening operation described below.

Figure 4:
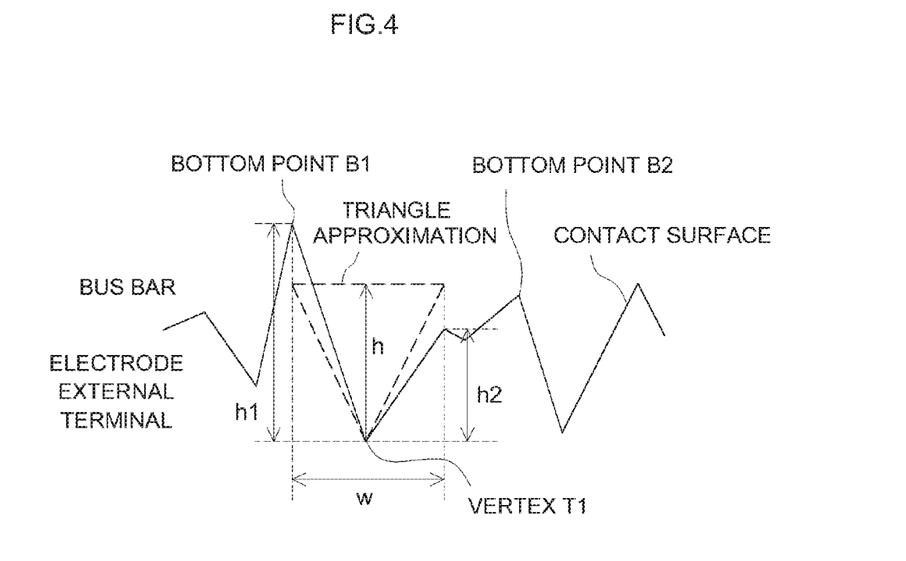
FIG. 4 is a cross-sectional diagram illustrating schematically a surface of contact of a metal-made bus bar with an electrode external terminal, for explaining a triangle approximation.

This roughness will be explained in specific terms further on. FIG. 4 illustrates schematically a terminal contact surface (i.e. roughened surface) of the bus bars 110. The terminal contact surfaces of the bus bars 110 have a predetermined roughness, and accordingly have protrusions and recesses. In FIG. 4 there are formed protrusions projecting downward. As illustrated in FIG. 4, the protrusions are approximated as triangles, having a base w and a height h. In the approximated triangular shape, the height h is equal to the average of a distance h1, in a vertical direction, from a bottom point B1 of a protrusion up to a vertex T1, and a distance h2, in the vertical direction, from the other bottom point B2 of the protrusion up to the vertex T1. That is, there holds h=(h1+h2)/2. The base w is equal to the distance, in the horizontal direction, between the bottom point B1 and the bottom point B2 of the protrusion. The vertical direction is a direction perpendicular to the roughened surface, and the horizontal direction is a direction parallel to the roughened surface. The terminal contact surfaces of the bus bars 110 have surface roughness satisfying $\{2[h^2+(w/2)^2]^{1/2}-w\}/w \geq \varepsilon$, where $\varepsilon$ denotes the fracture strain of an oxide film of terminal material of the electrode external terminals. In a case where different materials are used in the positive electrode external terminal 32 and in the negative electrode external terminal 42, the necessary surface roughness differs between the surface of contact of each bus bar 110 with the positive electrode external terminal 32 and the surface of contact with the negative electrode external terminal 42. Specifically, the surface of contact of the bus bar 110 with the positive electrode external terminal 32 has a surface roughness satisfying $\{2[h^2+(w/2)^2]^{1/2}-w\}/w \geq \varepsilon_p$, where $\varepsilon_p$ denotes the oxidative fracture strain of the material that makes up the positive electrode external terminal 32. The surface of contact of the bus bar 110 with the negative electrode external terminal 42 has a surface roughness satisfying $\{2[h^2+(w/2)^2]^{1/2}-w\}/w \geq \varepsilon_n$, where $\varepsilon_n$ denotes the oxidative fracture strain of the material that makes up the negative electrode external terminal 42. The surface roughness of the surface of contact of the bus bar 110 with the positive electrode external terminal 32 and the surface roughness of the surface of contact of the bus bar 110 with the negative electrode external terminal 42 may be identical to or different from each other, so long as the values of surface roughness satisfy the above relational expressions.

As another indicator, when the surface roughness of the terminal contact surface (i.e. roughened surface) of the bus bar 110 is represented by Ra, the surface roughness Ra may be for instance greater than 6.3.

Figure 5:
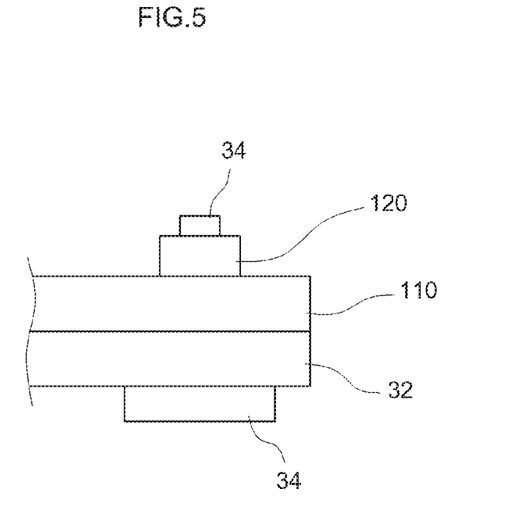
FIG. 5 is a cross-sectional schematic diagram of the periphery of a positive electrode terminal of a battery cell.

FIG. 5 illustrates a cross-sectional schematic diagram of the periphery of the positive electrode terminal 30.

Next, the positive electrode-side bolt 34 of one battery cell 1 and the negative electrode-side bolt 44 of another battery cell 1 are inserted into the through-holes of a bus bar 110, respectively as illustrated in FIG. 3 and FIG. 5, to thereby connect two battery cells 1. Next, respective nuts 120 are fitted to the tops of the positive electrode-side bolt 34 and the negative electrode-side bolt 44, to fasten the bus bar 110 with the positive electrode external terminal 32 and the negative electrode external terminal 42.

A material harder than the surface of the positive electrode external terminal 32 and than the surface of the negative electrode external terminal 42 is used in the bus bar 110. Further, the terminal contact surfaces of the bus bar 110 are roughened surfaces having a predetermined surface roughness; accordingly, the protrusions of the terminal contact surfaces of the bus bar 110 sink into the surface the positive electrode external terminal 32 and the surface of the negative electrode external terminal 42, due to stress during fastening. The oxide films formed on the surface of the positive electrode external terminal 32 and on the surface of the negative electrode external terminal 42 are stretched and break as a result. Moreover, since the protrusions of the terminal contact surfaces of the bus bar 110 sink into the surface of the positive electrode external terminal 32 and the surface of the negative electrode external terminal 42, fresh surfaces of terminal material become formed as a result at the surface of the positive electrode external terminal 32 and the surface of the negative electrode external terminal 42. At the same time, the bus bar 110 comes into contact with these fresh surfaces. Regeneration of the oxide film is suppressed through fastening, since the fresh surfaces are sealed by the bus bar 110.

In conventional art, the bus bar does not have the above roughened surface, and thus formation of a fresh surface is insufficient even through fastening using nuts. In particular, the oxide film is hard and resistance high in a case where the terminal material is aluminum. Accordingly, the battery pack exhibits resistance variability in a case where no plating is applied to the electrode external terminals.

By contrast, the battery cells 1 can be electrically connected to each other, while suppressing resistance variability, by bringing the bus bars 110 into contact with the fresh surfaces formed at the surface of the positive electrode external terminal 32 and the surface of the negative electrode external terminal 42, through breakage of the oxide film, as described above. That is, a battery pack 100 can be provided in which multiple battery cells 1 are electrically connected, with little resistance variability, using the bus bars 110, and without plating of the positive electrode external terminal 32 or the negative electrode external terminal 42.

The first embodiment is advantageous in that, except for the use of bus bars having a predetermined surface roughness, processes of conventional methods for producing a battery pack can be employed without modification.

The battery pack 100 produced in the first embodiment can have a characterizing feature in that the metal-made bus bars 110 is harder than the surfaces of the positive electrode external terminal 32 and the negative electrode external terminal 42, and the terminal contact surfaces of the bus bars 110 have protrusions and recesses, such that in an approximation of the protrusions as triangles there is satisfied $\{2[h^2+(w/2)^2]^{1/2}-w\}/w \geq \varepsilon$, where w denotes the base of the protrusions, h denotes the height of the protrusions, and $\varepsilon$ denotes the fracture strain of the oxide film of terminal material of the electrode external terminals.

In the first embodiment, the art disclosed herein applies to both the positive electrode terminal 30 side and the negative electrode terminal 40 side, but the art disclosed herein can be used also just for either one of the positive electrode terminal 30 side and the negative electrode terminal 40 side. Specifically, a configuration can be adopted wherein one among the positive electrode external terminal 32 and the negative electrode external terminal 42 is not plated, the metal-made bus bars 110 are harder than the tinplated electrode external terminal, and the surface of contact between the metal-made bus bars 110 and the tinplated electrode external terminal has a predetermined roughness.

Second Embodiment

The stacking step S101 in the second embodiment can be carried out in accordance with a known method. Specifically, the stacking step S101 can be carried out in the same way as in the first embodiment.

Figure 6:
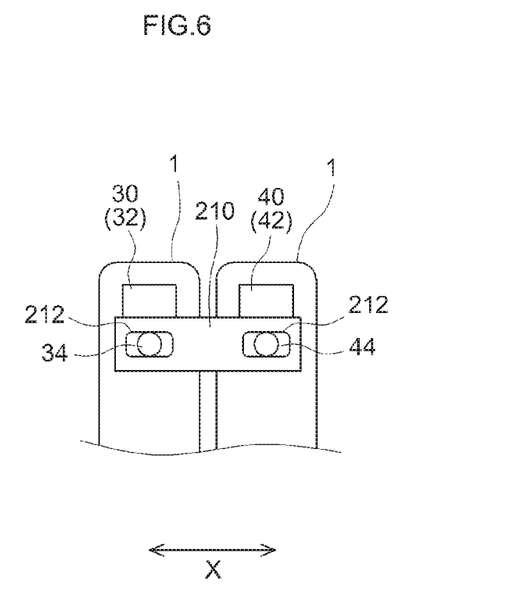
FIG. 6 is a top-view diagram illustrating schematically the configuration of a metal-made bus bar used in a second embodiment.

FIG. 6 illustrates schematically the configuration of a metal-made bus bar that is used.

In the connection step S102, the positive electrode external terminals 32 and the negative electrode external terminals 42 of the battery cells 1 are electrically connected by way of metal-made bus bars 210. The operation is explained in concrete terms below.

As illustrated in FIG. 5, each bus bar 210 has two through-holes 212 into which the positive electrode-side bolt 34 and the negative electrode-side bolt 44 can be respectively inserted. The through-holes 212 extend in the stacking direction X of the plurality of battery cells 1. Specifically, the through-holes 212 are slotted holes.

The hardness of the material of the bus bars 210 in the second embodiment is not particularly limited. The hardness may be set to a value that allows removing the oxide film from the surface of the positive electrode external terminal 32 and from the surface of the negative electrode external terminal 42, as a result of a below-described sliding operation. Desirably, a material having the same or greater hardness than that of the surface of the positive electrode external terminal 32 and of the surface of the negative electrode external terminal 42 is used in the bus bars 210.

The surface roughness of the metal-made bus bars 210 in the second embodiment is not particularly limited.

The positive electrode-side bolt 34 and the negative electrode-side bolt 44 are inserted into respective through-holes 212 of each bus bar 210, as illustrated in FIG. 5; as a result, the bus bar 210 is brought into contact with the surface of the positive electrode external terminal 32 of the positive electrode terminal 30 and the surface of the negative electrode external terminal 42 of the negative electrode terminal 40.

Next, the bus bar 210 is caused to slide along the stacking direction X, while being in contact with the surfaces of the electrode external terminals. The through-holes 212 of the bus bar 210 extend in the stacking direction X of the plurality of battery cells 1, being the sliding direction, and accordingly the bus bar 210 can be caused to slide easily. Through sliding of the bus bar 210, the oxide films present on the surface of the positive electrode external terminal 32 and on the surface of the negative electrode external terminal 42 are removed, and there are formed fresh surfaces of terminal material. The formed fresh surfaces are in contact with the bus bar 210.

After formation of the fresh surfaces, respective nuts are fitted to the tops of the positive electrode-side bolt 34 and the negative electrode-side bolt 44, and are fastened, in the same way as in the example illustrated in FIG. 3. As a result, the bus bar 210 becomes fixed, and there is maintained a state of contact between the bus bar 210 and the fresh surfaces of the terminal material at the surface of the positive electrode external terminal 32 and the surface of the negative electrode external terminal 42. Regeneration of the oxide film is suppressed since the fresh surfaces are sealed by the bus bar 210.

The plurality of battery cells 1 can be electrically connected, while suppressing resistance variability, by bringing thus the bus bars 210 into contact with the fresh surfaces formed at the surface of the positive electrode external terminal 32 and at the surface of the negative electrode external terminal 42. That is, a battery pack can be provided in which multiple battery cells 1 are electrically connected, with little resistance variability, using the bus bars 210, and without plating of the positive electrode terminals 30 or the negative electrode terminals 40.

In the second embodiment, the art disclosed herein applies to both the positive electrode terminal 30 side and the negative electrode terminal 40 side, but the art disclosed herein can be used also just for either one of the positive electrode terminal 30 side and the negative electrode terminal 40 side.

Third Embodiment

In the third embodiment, a fresh surface of terminal material is formed, using a physical method or chemical method, at the surface of the positive electrode external terminal 32 or the surface of the negative electrode external terminal 42, before execution of the connection step S102. The fresh surface is formed at least at the portions of contact of the surface of the positive electrode external terminal 32 and the surface of the negative electrode external terminal 42 with each bus bar 110. Examples of physical methods for forming the fresh surface include for instance a method that involves scraping the surface of the positive electrode external terminal 32 and the surface of the negative electrode external terminal 42 using for instance a file or a cutting tool, to thereby remove the oxide film from the surfaces, or a method that involves treating the surface of the positive electrode external terminal 32 and the surface of the negative electrode external terminal 42 by shot blasting or the like, to thereby remove the oxide film from the surfaces. Chemical methods include a method that involves treating the surface of the positive electrode external terminal 32 and the surface of the negative electrode external terminal 42 using for instance an acid, to thereby remove the oxide film from the surfaces.

Formation of the fresh surface ay be carried out prior to the stacking step S101, or after the stacking step S101.

The stacking step S101 in the third embodiment can be carried out in accordance with a known method. Specifically, the stacking step S101 can be carried out in the same way as in the first embodiment.

Figure 7:
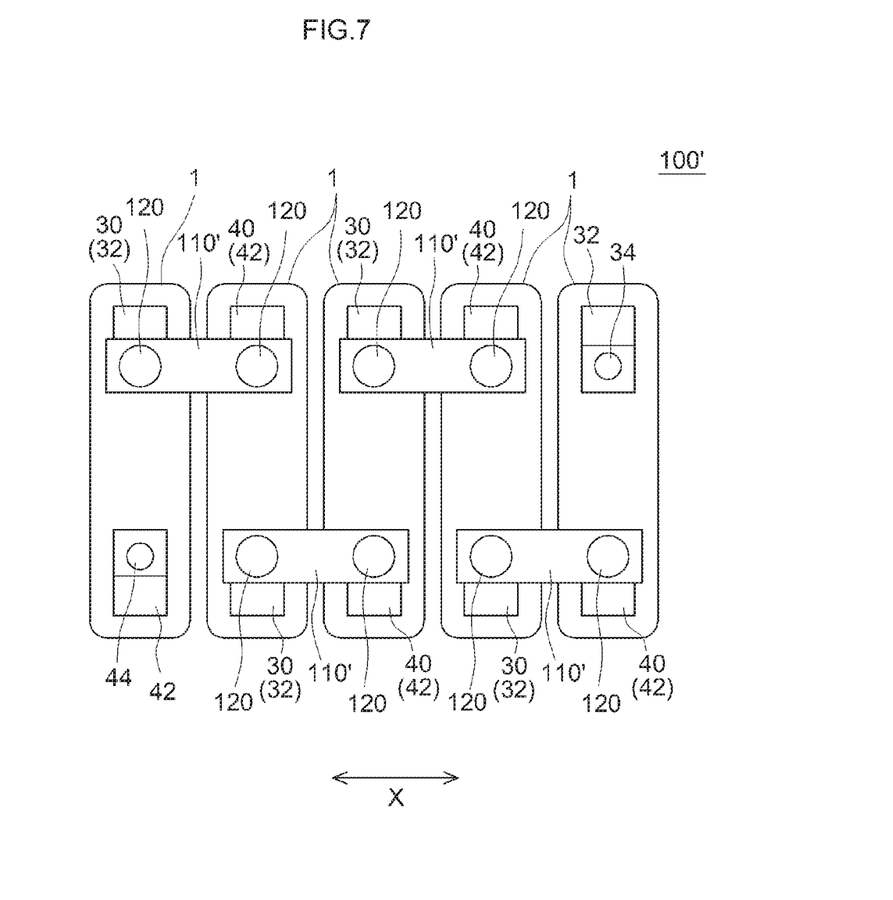
FIG. 7 is a top-view diagram illustrating another example of a battery pack obtained in accordance with the method for producing a battery pack of the present embodiment.

In the connection step S102, next, the positive electrode external terminals 32 and the negative electrode external terminals 42 of the battery cells 1 are electrically connected by way of metal-made bus bars.

Specifically, there are prepared metal-made bus bars 110' having two through-holes into which the positive electrode-side bolt 34 and the negative electrode-side bolt 44 can be respectively inserted, as illustrated in FIG. 7.

In the third embodiment, the hardness of the material of the bus bars 110' is not particularly limited, and this is advantageous since a softer material than those of the positive electrode external terminal 32 and the negative electrode external terminal 42 also can be used.

The surface roughness of the metal-made bus bars 110' in the third embodiment is not particularly limited.

The positive electrode-side bolt 34 of one battery cell 1 and the negative electrode-side bolt 44 of another battery cell 1 are inserted into the through-holes of a bus bar 110', respectively as illustrated in FIG. 7, to thereby connect two battery cells 1. The bus bar 110' and the fresh surfaces formed at the surface of the positive electrode external terminal 32 and at the surface of the negative electrode external terminal 42 are brought into contact with each other at this time. This contact occurs after formation of the fresh surface and before regeneration of the oxide film. Accordingly, the lapse of time from formation of the fresh surfaces at the surface of the positive electrode external terminal 32 and the surface of the negative electrode external terminal 42 until contact between the fresh surface and the bus bar 110' in the connection step S102 is desirably short, and specifically is desirably 2 hours or shorter, and more desirably 1 hour or shorter.

Next, respective nuts 120 are fitted to the tops of the positive electrode-side bolt 34 and the negative electrode-side bolt 44, and are fastened. As a result, the bus bar 110' becomes fixed, and there is maintained a state of contact between the bus bar 110' and the fresh surfaces of the terminal material at the surface of the positive electrode external terminal 32 and the surface of the negative electrode external terminal 42. Regeneration of the oxide film is suppressed since the fresh surfaces are sealed by the bus bar 110'.

Therefore, the plurality of battery cells 1 can be electrically connected while suppressing resistance variability, by bringing each bus bar 110' and the fresh surfaces formed at the surface of the positive electrode external terminal 32 and at the surface of the negative electrode external terminal 42 into contact with each other. That is, a battery pack 100' can be provided in which multiple battery cells 1 are electrically connected, with little resistance variability, using the bus bars 110', and without plating of the positive electrode external terminal 32 or the negative electrode external terminal 42.

In the third embodiment, the art disclosed herein applies to both the positive electrode terminal 30 side and the negative electrode terminal 40 side, but the art disclosed herein can be used also for just either one of the positive electrode terminal 30 side and the negative electrode terminal 40 side.

Concrete examples of the present teaching have been explained in detail above, but the examples are merely illustrative in nature, and are not meant to limit the scope of the claims in any way. The art set forth in the claims encompasses various alterations and modifications of the concrete examples illustrated above.

What is claimed is:

1. A method for producing a battery pack, the method comprising:
    a step of stacking a plurality of battery cells each having a battery case and electrode external terminals provided outside the battery case; and
    a step of electrically connecting the electrode external terminals of the plurality of battery cells by using a plurality of metal-made bus bars,
    wherein the electrode external terminals are not plated, and have oxide films on surfaces thereof,
    the method further comprising
    forming a fresh surface of terminal material at each surface of the electrode external terminals through breakage of the oxide films in the surfaces of the electrode external terminals; and
    bringing the fresh surface and the plurality of metal-made bus bars into contact with each other,
    wherein a material of the plurality of metal-made bus bars is harder than a material of the surfaces of the electrode external terminals, and
    in the electrical connection step, the plurality of metal-made bus bars are brought into contact with the electrode external terminals, and then the plurality metal-made bus bars are caused to slide along a stacking direction of the plurality of battery cells to form the fresh surface of terminal material at each surface of the electrode external terminals and bring the fresh surface and the plurality of metal-made bus bars into contact with each other.

* * * * *